United States Patent [19]

Okamoto et al.

[11] Patent Number: 4,996,590

[45] Date of Patent: Feb. 26, 1991

[54] CIRCUITRY FOR PREVENTING DOMING PHENOMENON IN A TELEVISION RECEIVER AND A PREVENTING METHOD THEREOF

[75] Inventors: Toshikazu Okamoto, Osaka; Fukashi Inoue, Nara, both of Japan

[73] Assignee: Sanyo Electric Co., Ltd., Moriguchi, Japan

[21] Appl. No.: 390,329

[22] Filed: Aug. 7, 1989

[30] Foreign Application Priority Data

Aug. 11, 1988 [JP] Japan .................. 63-201628

[51] Int. Cl.⁵ ............................................. H04N 9/16
[52] U.S. Cl. ........................................ 358/74; 358/39; 358/243
[58] Field of Search .................. 358/74, 28, 39, 211, 358/160, 168, 169, 170, 213.19, 219, 220, 243, 40

[56] References Cited

U.S. PATENT DOCUMENTS

| | | | |
|---|---|---|---|
| 3,914,545 | 10/1975 | Engel | 358/243 |
| 4,096,518 | 1/1978 | Tuma et al. | |
| 4,196,446 | 4/1980 | Rowe et al. | |
| 4,253,110 | 2/1981 | Harwood | 358/74 |
| 4,253,121 | 2/1981 | Avery | 358/243 |
| 4,587,554 | 5/1986 | Tamura et al. | |
| 4,689,668 | 8/1987 | Sutherland II | 358/243 |

FOREIGN PATENT DOCUMENTS 0090692 4/1987 Japan .

Primary Examiner—Howard W. Britton
Assistant Examiner—Michael H. Lee
Attorney, Agent, or Firm—Armstrong, Nikaido, Marmelstein, Kubovcik & Murray

[57] ABSTRACT

Circuitry for preventing a doming phenomenon in a color television receiver includes circuitry (5, 6, 7, 8, 9, 10) for detecting the presence or absence of a high luminance portion not less than a predetermined area on the television receiver screen, and circuitry (11, 60, 2, 3) for slowly and gradually reducing at least one of luminance and contrast of the screen when the high luminance portion not less than a predetermined area exists on the screen. The area detecting circuitry includes a circuit (5, 6; 5', 6') for detecting the presence of the high luminance portion on the screen, a first charge/discharge circuit 9 for generating a signal, the level of which shifts slowly in a first direction when this high luminance portion larger than a predetermined width exists, and shifts rapidly in a second direction when it is absent, a circuit (10) for comparing an output of the charge/discharge circuit with a second reference voltage and for deciding whether the area of the high lumiannce portion is not less than a predetermined area, a circuit (11) for generating a control signal for gradually reducing the luminance/contrast to the presence of the high luminance portion not less than a predetermined area in response to an output of the decision circuit and for rapidly recovering the luminance/contrast to the original state in response to the absence thereof.

17 Claims, 10 Drawing Sheets

FIG.9
(a) TERMINAL T5 INPUT
(b) TRANSISTOR Q7 OUTPUT
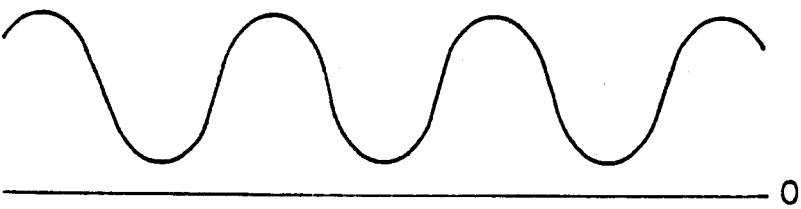
(c) TRANSISTOR Q8 OUTPUT
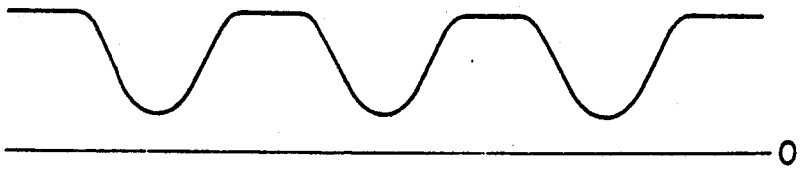
FIG.10
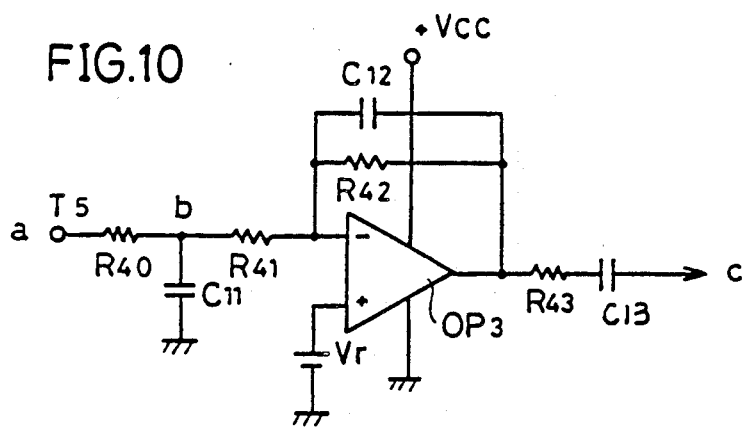
FIG.11
(a) 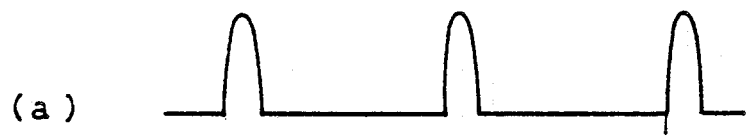
(b) 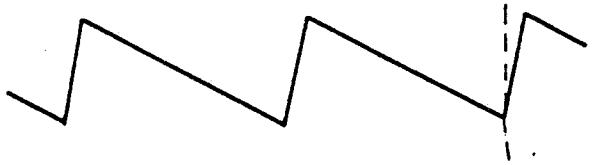
(c) 

CIRCUITRY FOR PREVENTING DOMING PHENOMENON IN A TELEVISION RECEIVER AND A PREVENTING METHOD THEREOF

BACKGROUND OF THE INVENTION

1. Field of the Invention

The present invention relates to circuitry for preventing doming phenomenon in a television receiver and a preventing method thereof.

2. Description of the Background Art

In a recent color television receiver, a cathode ray picture tube (CRT) is driven with a larger electron beam current than that in a conventional device in order to fulfill a demand for a reproduced picture of higher luminance. A phenomenon called "doming" occurs in driving with such a large beam current. This "doming" phenomenon will briefly be described.

FIG. 1A shows a schematic diagram of an entire cathode ray picture tube. Referring to FIG. 1A, the cathode ray picture tube includes an electron gun 500 for emitting electron beams of an intensity corresponding to a reproduced video signal, a deflection circuit 501 for generating a magnetic field for scanning the electron beams in the horizontal and vertical directions, a shadow mask 502 for selectively passing the electron beams, and phosphors 503 provided in an inner surface (a surface irradiated with the electron beams) of a faceplate (a phosphorescent surface) 504. The phosphors 503 each emitting a light of R (red), G (green) or B (blue) are provided in a predetermined sequence.

The shadow mask 502 comprises apertures for passing electron beams. Arrangement of the apertures of the shadow mask 502 is analogous to that of the phosphors 503 provided in the phosphorescent surface 504. Each of the apertures passes therethrough the respective electron beams corresponding to three kinds of colors, R, G and B to excite the associated phosphors of R, G and B for light emitting.

This shadow mask 502 absorbs approximately 80% of irradiating electron beams

Therefore, when a high luminance portion such as a white colored portion locally exists still for a long time (several tens seconds through several minutes), a portion of the shadow mask corresponding to that high luminance portion is irradiated with highly intense electron beams, so that the shadow mask 502 is partially, thermally distorted as shown in FIG. 1B. The portions denoted with A in FIG. 1B schematically shows the form of the normal shadow mask, while the portions denoted with B schematically shows the form of the shadow mask when thermally distorted. As a result, mislanding of the electron beams occurs such that the electron beams not only irradiate their corresponding phosphors but also other phosphors through the apertures of the shadow mask 502, thereby causing miscoloring in a reproduced high luminance portion and thus a phenomenon that the high luminance portion such as a white portion is tinged with red or blue. This miscoloring in the high luminance portion such as a white portion due to the thermal distortion of the shadow mask is called a doming phenomenon.

The doming phenomenon tends to occur at the periphery, such as both sides of a display screen, but not in the center of the screen. This is because even if the thermal distortion of the shadow mask occurs at the center portion, the mislanding of the electron beams does not occur due to a small deflection angle of the electron beams therein; on the other hand, the periphery of the screen is largely affected by the thermal distortion of the shadow mask due to a large deflection angle of the electron beams thereto.

As described above, the doming phenomenon is caused by the high luminance portion such as the white portion locally standing still on the screen for a long time. Thus, the doming phenomenon occurs even if an average beam current (an average value of the electron beam current) through the cathode ray picture tube over the entire screen is at a predetermined value or less. Therefore, the doming phenomenon cannot be prevented by the conventional circuit for detecting an increase of the average beam current through the cathode ray picture tube over the screen and for immediately reducing luminance and/or contrast, i.e., an ABL (Automatic Brightness Limiter) circuit or an ACL (Automatic Contrast Limiter) circuit.

Such a configuration is disclosed in U.S. Pat. No. 4,096,518 that the electron beam current is limited by reducing luminance and contrast. In this prior art, an average electron beam current level is detected, and chrominance signal amplitude limitation and luminance signal amplitude limitation are simultaneously performed depending on the detected level, thereby limiting excessive beam currents.

A circuit configuration for limiting the electron beam current flowing through the cathode ray tube is disclosed in U.S. Pat. No. 4,587,554. In this prior art, a black level of a video signal is detected, thereby to change the specific rate of a reduction rate of a luminance level to that of contrast depending on the detected black level.

Another configuration is disclosed in U.S. Pat. No, 4,196,446 that the electron beam current is varied monotonously depending on the scanning distance of the electron beam with respect to the center of the screen.

In this prior art, the electron beam current is reduced monotonously depending on the distance from the center of the screen, thereby achieving uniformity in size of beam spots.

SUMMARY OF THE INVENTION

It is an object of the present invention to provide circuitry for reliably preventing the doming phenomenon.

It is another object of the present invention to provide circuitry being capable of reliably preventing the doming phenomenon in a simple circuit configuration.

It is a further object of the present invention to provide a television receiver which does not have the doming phenomenon occur.

It is a still further object of the present invention to provide a method of reliably preventing the doming phenomenon in a television receiver.

Circuitry for preventing the doming phenomenon in accordance with the present invention comprises circuitry for deciding whether or not a high luminance portion not less than a predetermined area exists in a reproduced picture in response to a luminance signal included in a video signal, and circuitry for gradually reducing at least one of contrast and luminance of the reproduced picture in response to a signal of detecting the presence of the high luminance portion not less than the predetermined area from that decision circuitry.

Preferably, the decision circuitry comprises a low pass filter for removing high frequency components of the luminance signal included in the video signal, first comparison circuitry for comparing an output of the low pass filter with a first reference voltage, charge/discharge circuitry for carrying out either charge or discharge of the output stage thereof in response to an output of the comparison circuitry, and second comparison circuitry for comparing an output of the charge/discharge circuitry with a second reference voltage level.

More preferably, the first reference voltage has the voltage level changed periodically and alternately at the center and at the periphery of the screen.

As so far mentioned, the doming phenomenon does not occur immediately responsive to the presence of the local high luminance portion, but gradually occurs when the high luminance portion exists continuously for a certain time period. Therefore, as mentioned above, due to gradual reduction in at least one of the luminance and contrast of the screen in the presence of the high luminance portion not less than the predetermined area, the electron beam current is reduced as well, thereby preventing thermal distortion of a shadow mask. Accordingly, the doming phenomenon can be reliably prevented without providing an objectionable image to viewers.

Further, since the doming phenomenon is liable to occur at its periphery rather than in the center of the screen, if a reference voltage which changes in a scanning period (horizontal and vertical scanning periods or a horizontal scanning period) is employed as the first reference voltage as described above, the sensitivity in detection of the high luminance portion at the periphery of the screen is enhanced, resulting in more reliable prevention of the doming phenomenon, adapted to practical use.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a signal waveform diagram illustrating the operation of a horizontal modulation voltage producing circuit shown in FIG. 6, FIG. 10 is a diagram illustrating another configuration of a reference voltage producing circuit employed in the circuitry for preventing the doming phenomenon according to another embodiment of the present invention, FIG. 11 is a signal waveform diagram illustrating the operation of the reference voltage producing circuit shown in FIG. 10.

DESCRIPTION OF THE PREFERRED EMBODIMENTS

Figure 1A:
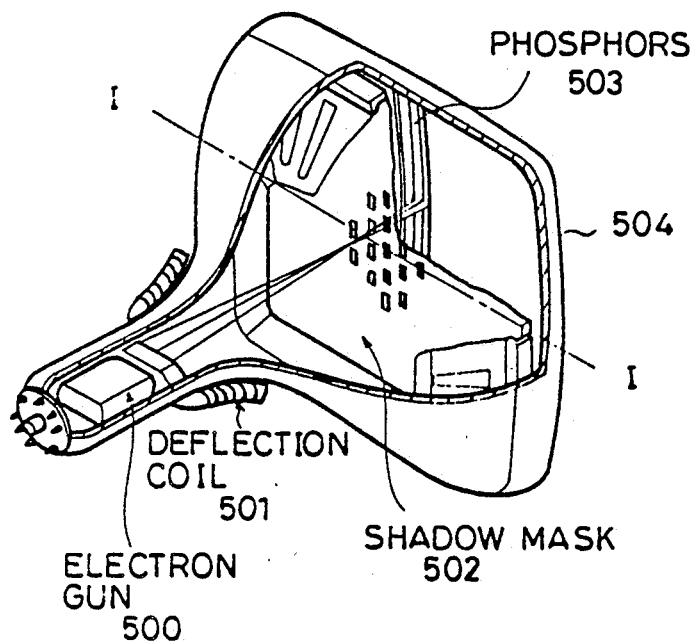
FIG. 1A and 1B are diagrams for illustrating a mechanism of occurrence of a doming phenomenon.
Figure 1B:
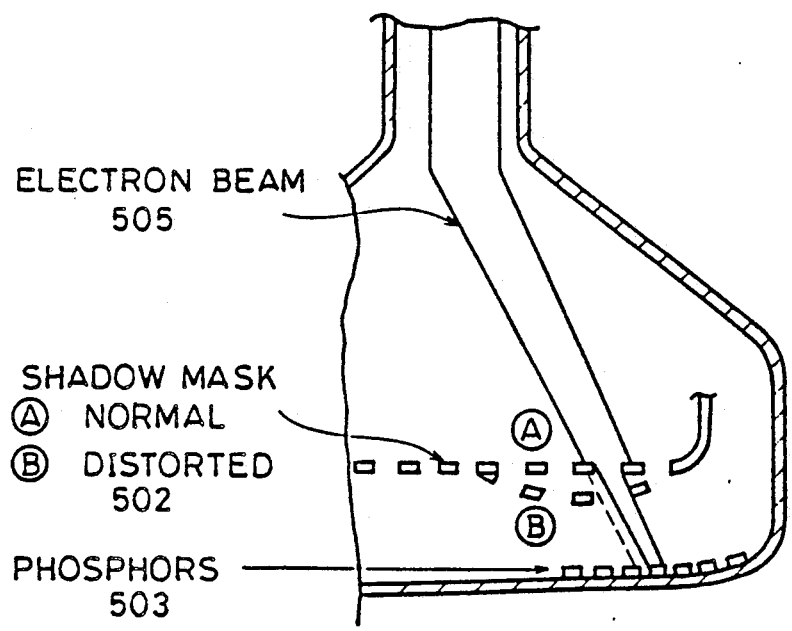
Figure 2:
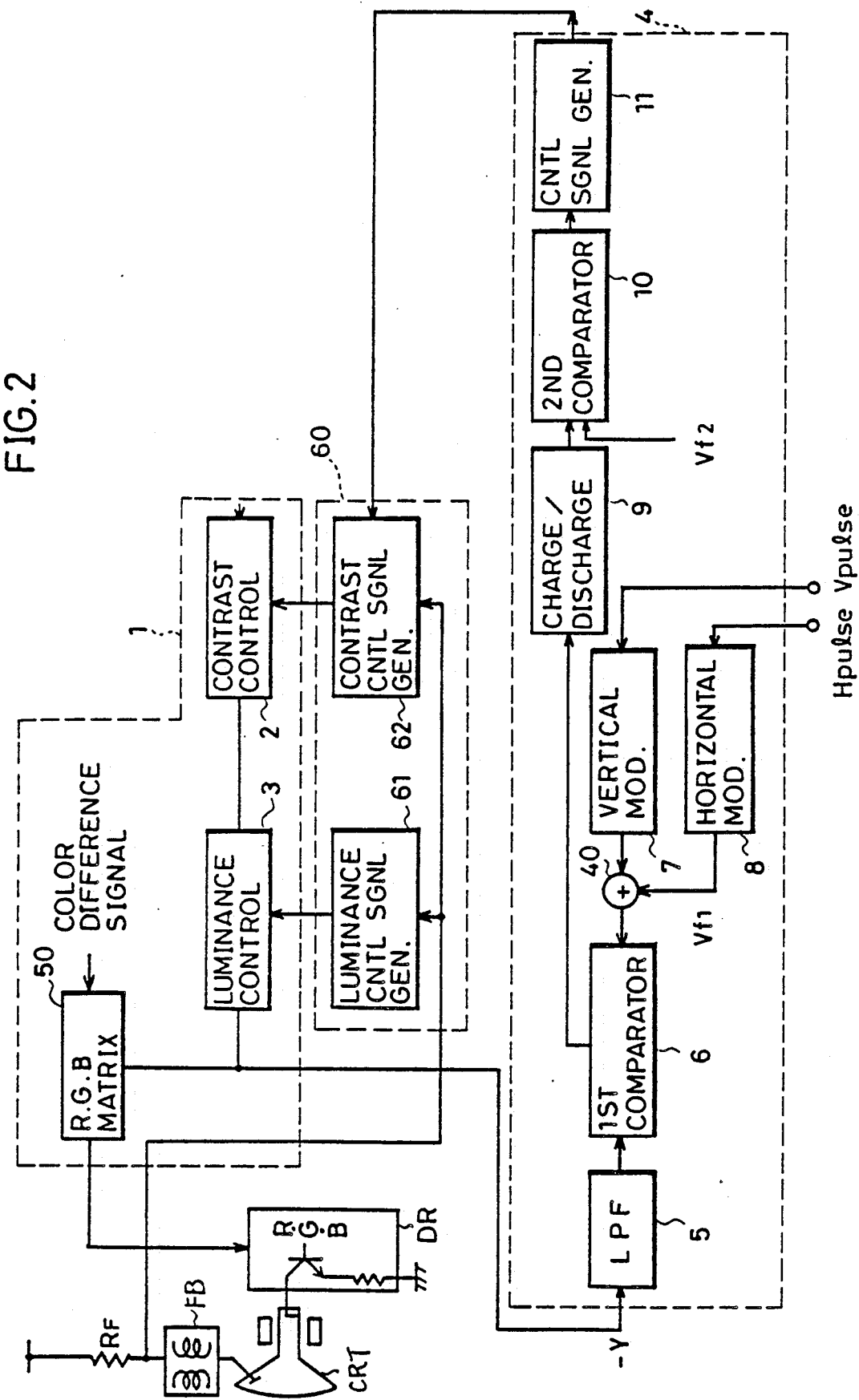
FIG. 2 is a diagram illustrating a schematic configuration of an entire television receiver comprising circuitry for preventing a doming phenomenon according to one embodiment of the present invention.

Referring to FIG. 2, the circuitry for preventing the doming phenomenon of the invention comprises a luminance/chroma signal processing circuit block 1, a circuit block 4 for detecting a luminance portion in a reproduce screen, and a circuit block 60 for generating a signal for controlling luminance and contrast of a picture to be reproduced.

The luminance/chroma signal processing circuit block 1 comprises a contrast control circuit 2 for controlling contrast (a ratio of a white level to a black level) of a picture, a luminance control circuit 3 for controlling a luminance signal level of a picture, and an RGB matrix 50 for deriving signals of three colors, R, G and B from a luminance signal ($-Y$ signal of negative polarity) from the luminance control circuit 3 and color difference signals. This luminance/chroma signal processing circuit block 1 is, for example, formed by employing an integrated circuit such as AN5301NK manufactured by Matsushita Electric Works, Ltd.

The R, G and B signals from the RGB matrix 50 are applied to a drive circuit DR for driving a cathode ray picture tube CRT so that electron beams of an intensity corresponding to the respective R, G and B signals are emitted therein. A high voltage $V_H$ of approximately $+140$ V is, for example, boosted and applied to the anode of the cathode ray picture tube CRT via a resistance $R_F$ and a flyback transformer FB.

The luminance/contrast control block 60 comprises a circuit 61 for generating a luminance control signal and a circuitry 62 for generating a signal for controlling the contrast. The luminance control signal generating circuit 61 and the contrast control signal generating circuit 62 generate signals for controlling the luminance and contrast depending on a voltage at the connecting point of the resistance $R_F$ and the flyback transformer FB, respectively. That is, when a large electron beam current flows through the CRT, a large current also flows through the resistance $R_F$, and thus a potential on the connecting point of the resistance $R_F$ and the flyback transformer FB is lowered. In response to this lowered potential, the circuits 61 and 62 generate control signals for rapidly reducing the luminance and the contrast.

Accordingly, the luminance and contrast is controlled by so-called ABL and ACL.

The contrast control signal generating circuit 62 is also supplied with a control signal from the high luminance detecting circuit 4. Thus, in the case that the high luminance portion appears locally on the screen, a signal for reducing the contrast is generated via the contrast control signal generating circuit 62 in response to the control signal from the high luminance detecting circuit 4.

The high luminance portion detecting circuit block 4 comprises a low pass filter 5, a vertical modulation voltage producing circuit 7, a horizontal modulation voltage producing circuit 8, an adder 40 for adding outputs of the vertical modulation voltage producing circuit 7 and of the horizontal modulation voltage producing circuit 8 to a DC bias voltage, a first comparator 6 for comparing an output of the low pass filter 5 with an output of the adder 40, a charge/discharge circuit 9 for charging or discharging responsive to an output of the first comparator 6, a second comparator 10 for comparing an output of the charge/discharge circuit 9 with a second reference voltage Vf2, and a control signal generating circuit 11 for generating a control signal for gradually reducing the luminance or contrast in response to an output of the second comparator 10.

The low pass filter 5 passes therethrough only low frequency components of the luminance signal of negative polarity from the luminance control circuit 3, thereby reducing high frequency components corresponding to stripes or the like on the screen.

The vertical modulation voltage producing circuit 7 generates a voltage signal, the level of which changes in a vertical scanning period in response to a signal having the vertical scanning period. The horizontal modulation voltage producing circuit 8 generates a voltage signal, the level of which changes in a horizontal scanning period in response to a signal having the horizontal scanning period. The adder 40 adds the voltage signals from the vertical and horizontal modulation circuits 7 and 8 to the DC bias voltage so as to provide a first reference voltage signal Vf1. The sensitivity in detection of the high luminance portion at the periphery of the screen is enhanced by employing such a reference voltage signal Vf1 changing in level at the vertical and horizontal scanning periods.

The first comparator 6 compares the first reference voltage Vf1 with the luminance signal from the low pass filter 5 so as to generate a signal indicating the presence/absence of a high luminance portion not less than a predetermined width on the screen.

The charge/discharge circuit 9 charges or discharges an output voltage thereof responsive to a detecting signal from the first comparator 6 and generates a signal corresponding to the charged or discharged voltage level. The charge/discharge circuit 9 has characteristics of discharging rapidly in response to a high luminance portion detecting signal from the first comparator 6; and otherwise charging at a lower speed.

The second comparator 10 compares the output voltage from the charge/discharge circuit 9 with the second reference voltage Vf2. The second comparator 10 generates a signal indicating the presence of the high luminance portion not less than a predetermined area in the case that the output voltage of the charge/discharge circuit 9 exceeds the second reference voltage Vf2.

The control signal generating circuit 11 charges or discharges an output voltage thereof responsive to a signal from the second comparator 10. A control signal from this control signal generating circuit 11 changes in level slowly in response to a high luminance portion detecting signal from the second comparator 10, while recovering rapidly to the original state if the high luminance portion is no longer detected. For example, a charge/discharge circuit in the control signal generating circuit 11 has a time constant in charging set to be considerably larger than a time constant in discharging. Accordingly, luminance is gradually reduced through reduction in the contrast of the reproduced picture upon detection of the high luminance portion not less than a predetermined area. The output voltage signal from this control signal generating circuit 11 is transmitted to the contrast control circuit 2 via the contrast control signal generating circuit 62. Next, the operation of each of the circuits shown in FIG. 2 will be described with reference to FIGS. 3–5 which are the operation waveform diagrams thereof.

Figure 3:
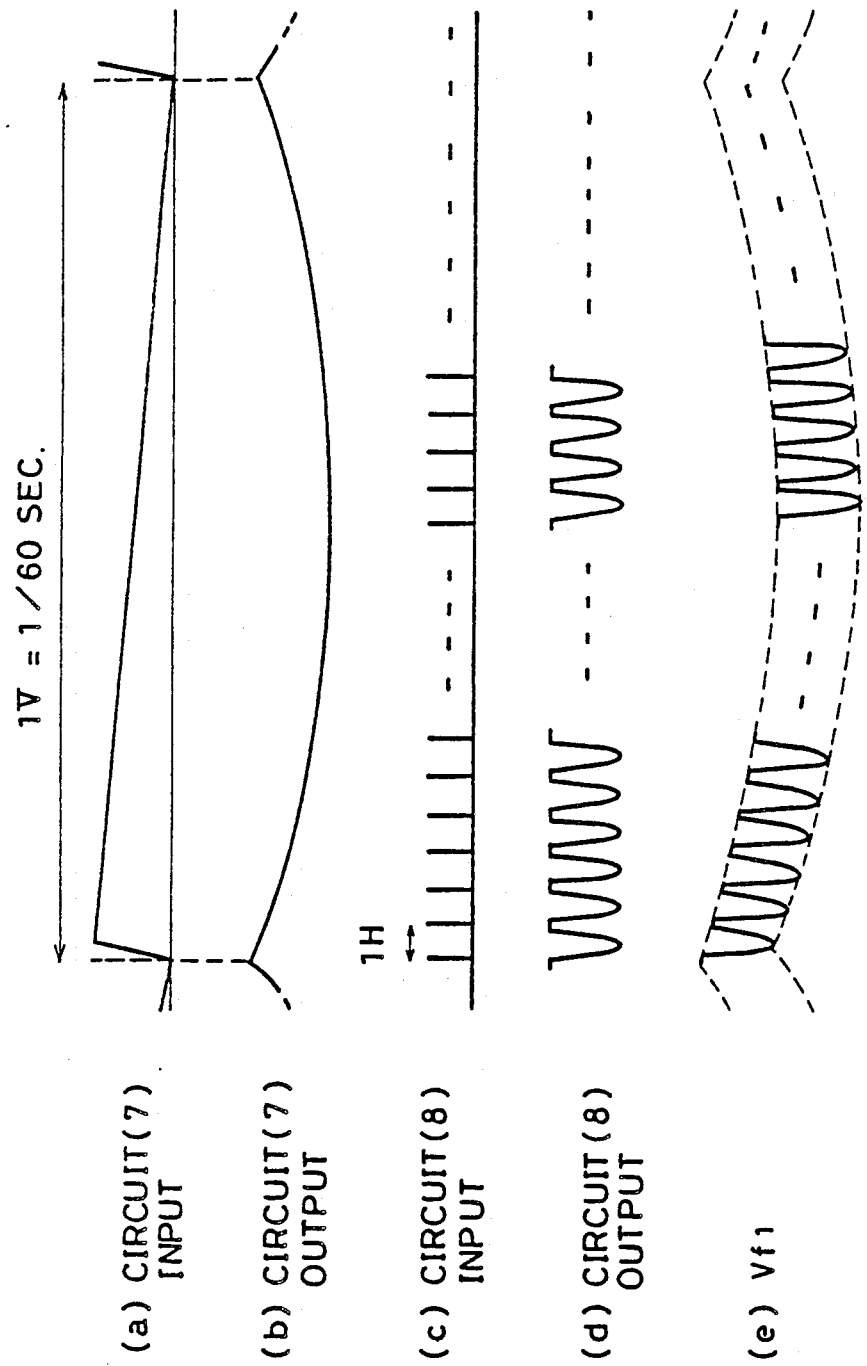
FIG. 3 is a waveform diagram illustrating the operation of a circuit for generating a reference voltage shown in FIG. 2.

First of all, production of the first reference voltage Vf1 will be described with reference to FIG. 3. The vertical modulation voltage producing circuit 7 is supplied with a pulse signal with a vertical scanning period (1/60 sec) or a saw-tooth wave signal. The vertical modulation voltage producing circuit 7 derives a parabola wave voltage signal with the vertical scanning period from this pulse signal or the saw-tooth wave signal. The horizontal modulation voltage producing circuit 8 is supplied with a pulse signal with a horizontal scanning period (1H:1/$f_H$). The horizontal modulation voltage producing circuit 8 derives a sine wave signal with the period 1/$f_H$ from the pulse signal with the horizontal scanning period and slices this sine wave signal at a predetermined level to output the same. The adder 40 adds an output of the vertical modulation voltage producing circuit 7 to an output of the horizontal modulation voltage producing circuit 8 to output the first reference voltage Vf1. Therefore, the first reference voltage Vf1 has a waveform produced by modulating the output of the horizontal modulation circuit 8 with the output of the vertical modulation circuit 7, as shown in FIG. 3(e). This reference voltage Vf1 becomes higher in the upper and lower portions and the right and the left portions of the screen, but becomes lower in the center of the screen. Accordingly, the sensitivity in detection of the high luminance portion is enhanced at the periphery of the screen which is liable to cause a doming phenomenon.

Next, a circuit operation for each horizontal scanning period will be described with reference to FIG. 4. As shown in FIG. 4(a), such a case will now be considered that a high luminance portion WH exists locally on the screen. The low pass filter 5 receives the luminance signal −Y of negative polarity from the luminance control circuit 3 to pass only its low frequency components therethrough. In the case of a horizontal scanning line S1, the luminance portion WH is not yet scanned. Therefore, an output signal level from the low pass filter 5 is higher than a first reference voltage signal Vf1, and an output signal level of the comparator 6 remains at the "L" level (logical low). In this case, the charge/discharge circuit 9 is at a charging state of the normal state, and the output signal level thereof is higher than a second reference voltage level Vf2 and an output signal level of the second comparator 10 is also at the "L" level.

The high luminance portion WH is first scanned on a horizontal scanning line S2. Only the part of the output signal −Y, which corresponds to this high luminance portion WH has its level exceed the first reference voltage Vf1 (i.e., it becomes lower than the Vf1). Thus, the output signal of the first comparator 6 rises to the "H" level (logical high). The charge/discharge circuit 9 rapidly carries out a discharge operation to slightly lower the output signal level thereof responsive to the output signal of the "H" level from this comparator circuit 6. Since the discharge operation of the charge/-discharge circuit 9 is only performed during a period corresponding to this high luminance portion, the output signal level from the charge/discharge circuit 9 has not yet exceeded the second reference voltage Vf2. In the portions other than the high luminance portion, the charge operation is slowly performed in the charge/discharge circuit 9, so that the output signal level thereof gradually rises. If the high luminance portion WH is scanned several times (for example, 4 times in FIG. 4), the output signal level of the charge/discharge circuit 9 gradually falls due to a difference in time constants in charging and discharging, and exceeds the second reference voltage Vf2 (namely, it becomes lower than the Vf2). When the output signal of the charge/discharge circuit 9 exceeds the second reference voltage Vf2, the output signal of the second comparator 10 rises to the "H" level to cause a discharge in the control signal generating circuit 11 and a gradual reduction of the output signal level thereof. The control signal from the control signal generating circuit 11 is applied to the contrast control circuit 2 via the contrast control signal generating circuit 62. The contrast control circuit 2 gradually reduces the contrast and therefore the luminance depending on the level of the control signal from the control signal generating circuit 1. Therefore, the contrast/luminance of the entire reproduced picture are gradually reduced in response to the control signal from the control signal generating circuit 11.

The doming phenomenon does not occur immediately after a high luminance portion appears as described above; however, the phenomenon gradually develops due to the long static existence of the high luminance portion and the resultant gradual rise in temperature of the shadow mask, and emerges markedly after a predetermined time (several tens seconds). Therefore, a gradual reduction in the luminance/contrast of the screen reliably prevents the doming phenomenon without providing unnatural changes in the luminance of the screen to the viewers, as has been described above.

Figure 4:
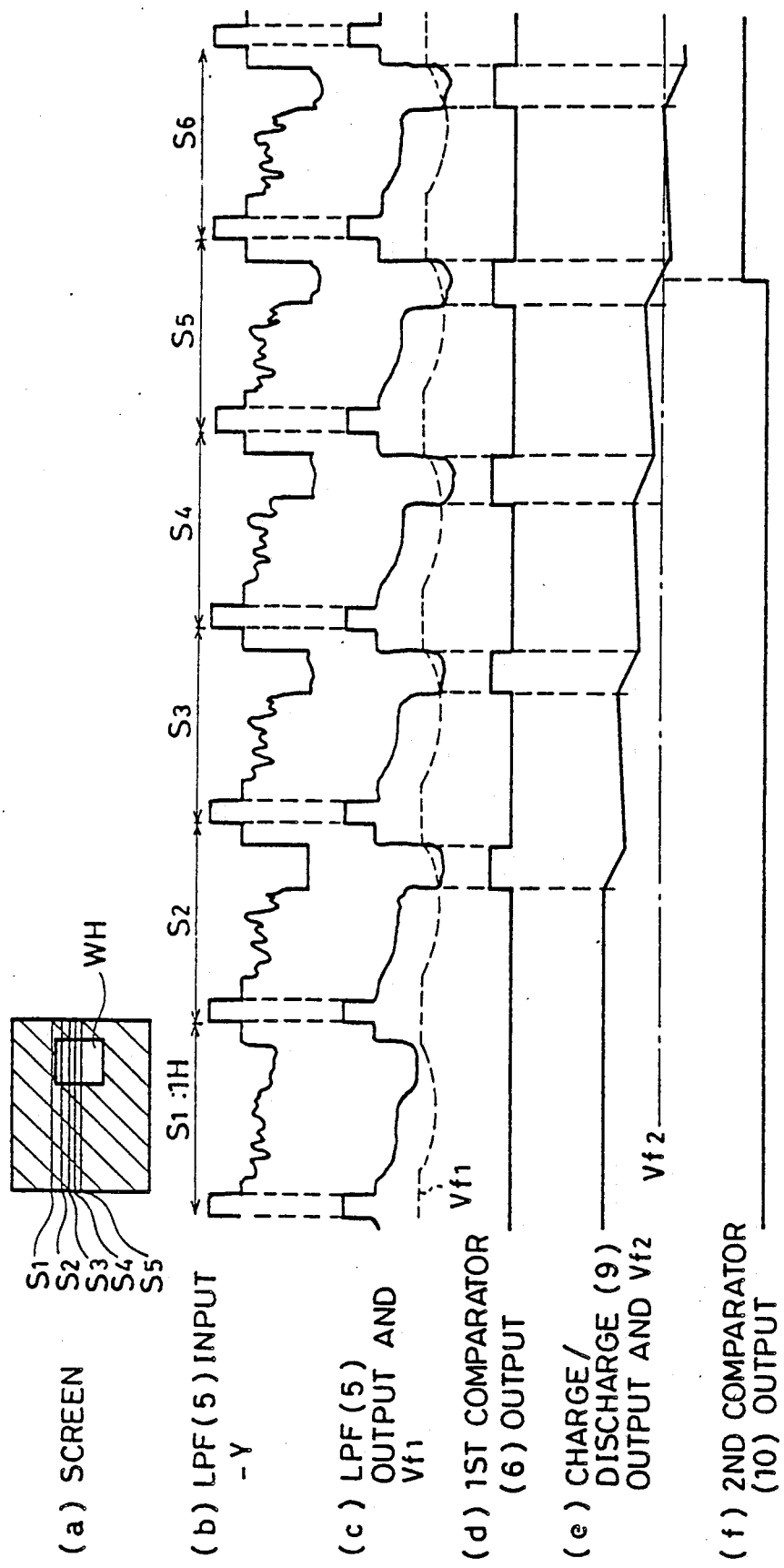
FIG. 4 is a waveform diagram illustrating the operation of each circuit in one field in a high luminance detecting circuit shown in FIG. 2.

The above described operation shown in FIG. 4 is performed during one vertical period. Next, the operation to be performed for a long time (several seconds; several tens fields) will be described with reference to FIG. 5. First of all, when the high luminance portion WH appears on the screen, the output signal level of the charge/discharge circuit falls by degrees. If the area of the high luminance portion WH is not less than a predetermined area, the output signal level of the charge/discharge circuit 9 becomes smaller than the second reference voltage Vf2, and the output signal of the second comparator 10 rises to the "H" level. Accordingly, the discharge of the control signal generating circuit 11 causes the output signal level thereof to fall by degrees, resulting in the gradual reduction in the contrast/luminance of the entire screen and in the luminance of the high luminance portion WH, as described above.

Figure 5:
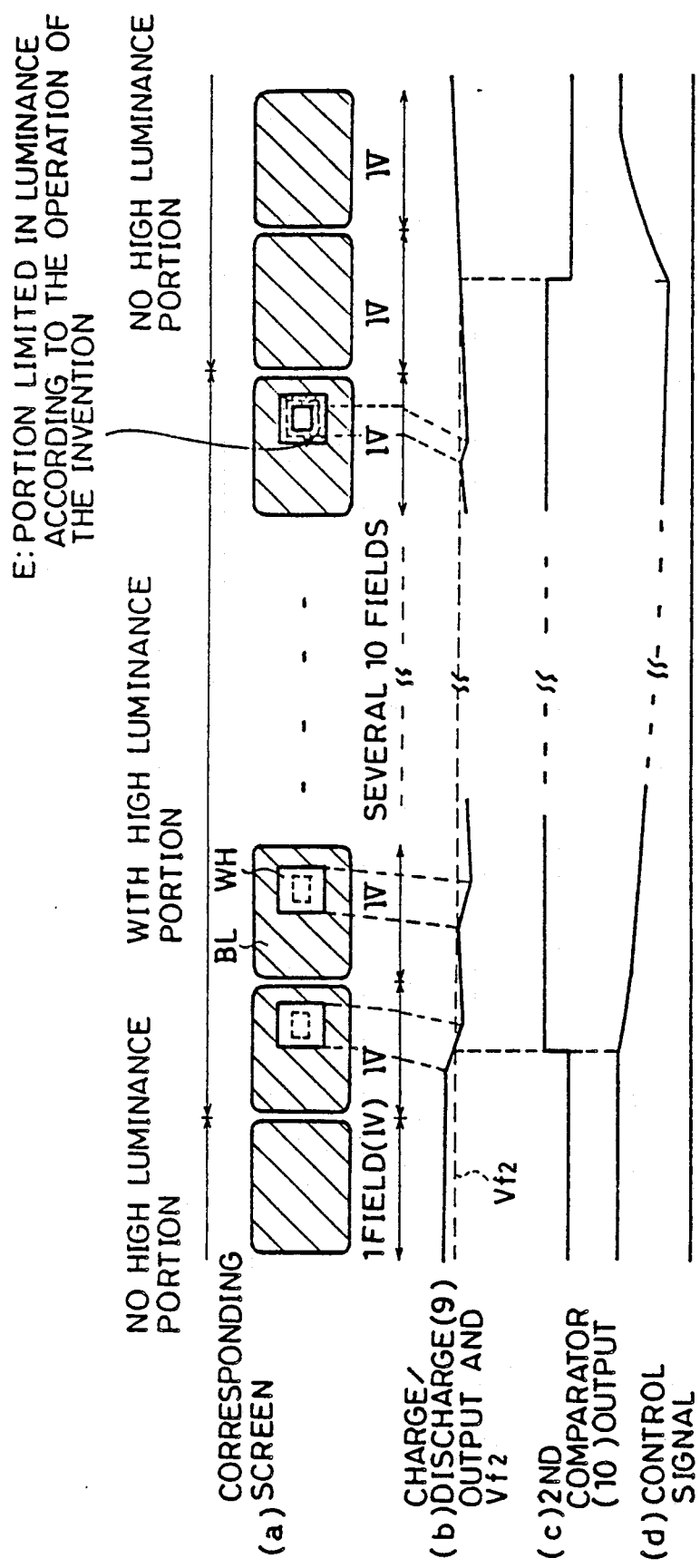
FIG. 5 is a waveform diagram showing a relation between the over-long-time operation of the high luminance detecting circuit shown in FIG. 2 and the corresponding screen.

If the high luminance portion WH shown in FIG. 5 has a luminance distribution, and the inner portion of this high luminance portion WH enclosed by the broken-line block has a maximum luminance, a region except for the maximum luminance portion of the high luminance portion WH is only first limited in luminance. Accordingly, the discharge operation in the charge/discharge circuit 9 is not caused in this portion (within the broken-line block) has an area not less than a predetermined area, the discharge operation is successively carried out in the charge/discharge circuit 9, resulting in reduction in the contrast/luminance of the entire screen.

In the case that the screen changes in displayed image and thus the high luminance portion WH disappears, the charge operation in the charge/discharge circuit 9 causes its output potential level to exceed this reference voltage Vf2, so that the output signal level of the second comparator 10 falls to the "L" level. Accordingly, the output signal of the control signal generating circuit 11 is charged rapidly to the level of the normal state, thereby recovering the contrast/luminance of the screen to the original state. In the case that the high luminance portion WH disappears, the content in the contrast/luminance of the screen, as described above, do not become objectionable to the viewers. Next, the detailed configuration of and the operation of each of the circuit blocks will be described.

Figure 6:
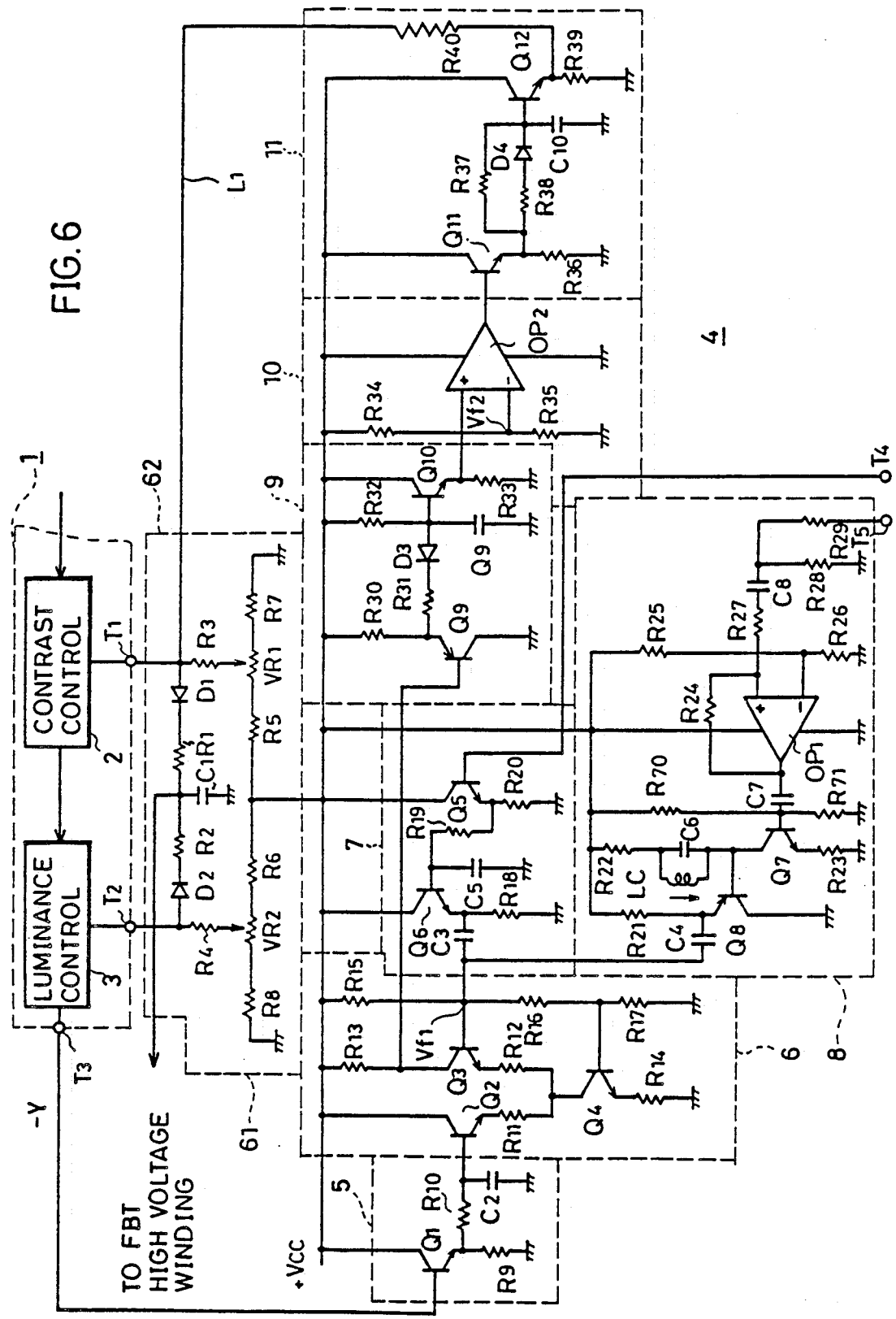
FIG. 6 is a diagram illustrating one example of the detailed configuration of the circuitry for preventing the doming phenomenon according to one embodiment of the present invention.

FIG. 6 shows one example of the detailed configuration of the circuitry for preventing the doming phenomenon. It should be noted that the output waveform shown is substantially the same as that in FIG. 5 excluding that the output waveforms of the first and second comparators 6 and 10 are reversed in polarity to those therein. However, such a reversion in polarity can be compensated for by reversing the control polarity for the charge/discharge of the subsequent circuits 9 and 11 to obtain substantially the same operation of the circuit in FIG. 2.

Referring to FIG. 6, the low pass filter 5 comprises an npn bipolar transistor Q1, a resistance R10 and a capacitor C2 for integrating an emitter output of the transistor Q1 to pass only low frequency components, and an emitter resistance R9. The npn transistor Q1 has its base supplied with a luminance signal $-Y$ of negative polarity from the luminance control circuit 3, its collector connected to a supply voltage $+Vcc$ and its emitter connected to the ground potential via the resistance R9. The capacitor C2 is connected to the emitter of the transistor Q1 in parallel to the resistance R9 via the resistance R10. The low pass filter 5 passes therethrough only a frequency region determined by the respective resistance value and capacitance value of the resistance R10 and the capacitor C2. The potential at the capacitor C2 is transmitted to the first comparator 6. The resistance R9 is the emitter resistance of the bipolar transistor Q1 to provide to this transistor stable operation characteristics.

The first comparator 6 comprises npn bipolar transistors Q2 and Q3 for constituting a differential-type comparator, and an npn bipolar transistor Q4 for supplying a constant current to a differential comparator stage. The transistor Q2 has its base coupled to the output of the low pass filter 5, its collector connected to the supply potential Vcc, and its emitter connected to the collector of the transistor Q4 via a resistance R11.

The transistor Q3 has its base supplied with output signals from the horizontal modulation voltage producing circuit 8 and the vertical modulation voltage producing circuit 7, its collector connected to the supply potential Vcc via a resistance R13, and its emitter connected to the collector of the transistor Q4 via the resistance R12. The transistor Q14 has its base supplied with a bias voltage determined by the resistance ratio of resistances R15, R16, and R17 and its emitter connected to the ground potential via the resistance R14. The transistor Q3 has its base further supplied with a bias voltage determined by the ratio of the resistance R15, R16 and R17. A signal indicating a result of the comparison is derived from the collector of the bipolar transistor Q3 and transmitted to the charge/discharge circuit 9.

The charge/discharge circuit 9 comprises an npn bipolar transistor Q9, a resistance R31, a diode D3 and a capacitor C9. The transistor Q9 has its emitter connected to the supply potential Vcc via a resistance R30, its collector connected to the ground potential, and its base supplied with the output of the comparator circuit 6.

The capacitor C9 has one electrode connected to the transistor Q9 via the diode D3 and the resistance R31 and also to the supply potential Vcc via a resistance R32. The capacitor C9 has the other electrode connected to the ground potential. The diode D3 has its cathode connected to the resistance R31 and its anode connected to the resistance R32 and to one electrode of the capacitor C9. The resistance R31 has a relatively small resistance value, while the resistance R32 has a large resistance value. Therefore, the capacitor C9 is gradually charged via the resistance R32 of higher resistance when the transistor Q9 is OFF; on the other hand, the capacitor C9 is rapidly discharged via the resistance R31 of lower resistance when the transistor Q9 is ON.

The charge/discharge circuit 9 further comprises an npn bipolar transistor Q10 at an output stage. The bipolar transistor Q11 has its base supplied with an output of the operational amplifier OP2, its collector connected to the supply potential Vcc, and its emitter connected to the ground potential via a resistance R36. The transistor Q11 has its emitter also connected to one electrode of the capacitor C10 via the resistance R38 and the diode D4. The diode D4 has its anode connected to the resistance R38 and its cathode connected to one electrode of the capacitor C10. The resistance R37 is provided in parallel to a series body of this resistance R38 and the diode D4. The transistor Q12 has its collector connected to the supply potential Vcc, its base connected to one electrode of the capacitor C10, and its emitter connected to the ground potential via a resistance R39 and also coupled to the contrast control signal generating circuit 62 via a resistance R40. The resistance R37 has a relatively high resistance, while the resistance R38 has a relatively low resistance. Therefore, the capacitor C10 is rapidly charged via the resistance R38 when the transistor Q11 is ON; however, the capacitor C10 is relatively slowly discharged via the resistance R37 when the transistor Q11 is OFF.

The contrast control signal generating circuit 62 comprises resistances R3, R5, R7 and a variable resistance VR1 for adjusting a contrast level, and a diode D1, a resistance R1 and a capacitor C1 for making the ABL operation. The resistance R5, the variable resistance VR1 and the resistance R7 are connected in series between the supply potential Vcc and the ground potential. The resistance R3 has one end connected to the variable resistance VR1 and the other end connected to the contrast control circuit 2 via the terminal T1. Further, a control signal applied through a signal line L1 from the control signal generating circuit 11 is coupled to the other end of the resistance R3, and similarly transmitted to the contrast control circuit 2 via the terminal T1. The diode D1, the resistance R1 and the capacitor C1 are connected in series between the other end of the resistance R3 and the ground potential. The capacitor C1 has one electrode connected to a high voltage winding of the flyback transformer (see FIG. 2).

The luminance control signal generating circuit 61 comprises a resistance R8, a variable resistance VR2 and a resistance R6 connected in series between the supply potential Vcc and the ground potential, a resistance R4 for defining a luminance level, a diode D2 and a resistance R2 and a capacitor C1 for applying the luminance ABL. Therefore, the capacitor C1 is used in common for the luminance control signal generating circuit 61 and the contrast control signal generating circuit 62. The resistance R4 has one end connected to the variable resistance VR2 and the other end connected to the luminance control circuit 3 via a terminal T2. The diode D2 and the resistance R2 are connected in series between the other end of the resistance R4 and one electrode of the capacitor C1.

The vertical modulation voltage producing circuit 7 comprises npn bipolar transistors Q5 and Q6 and capacitors C5 and C3. The transistor Q5 has its base supplied with a saw-tooth wave voltage signal with a vertical scanning period applied via a terminal T4, its collector connected to the supply potential Vcc, and its emitter connected to the ground potential via a resistance R20 and also to the base of the transistor Q6 via a resistance R19. The transistor Q6 has its collector connected to the supply potential Vcc, and its emitter connected to the capacitor C3 and also to the ground potential via a resistance R18. The capacitor C5 is provided between the base of the transistor Q6 and the ground potential. The bipolar transistor Q5 operates as an emitter follower. When the transistor Q5 is ON, an integrating circuit formed of the resistance R19 and the capacitor C5 integrates an emitter output of the transistor Q5 (the saw-tooth wave voltage signal) and transmits the same to the base of the transistor Q6. The bipolar transistor Q6 operates in an emitter follower manner, and transmits a voltage responsive to this base voltage to the capacitor C3. The saw-tooth wave signal with a vertical period is converted into a parabola wave voltage by the integrating circuit formed of the resistance R19 and the capacitor C5. This parabola wave voltage is output from the emitter of the emitter follower transistor Q6, and output as a modulated output voltage via the coupling capacitor C3. The horizontal modulation voltage producing circuit 8 comprises an operational amplifier OP1, a resonance circuit LC for making a horizontal scanning frequency be a resonant frequency, an npn bipolar transistor Q7 and a pnp bipolar transistor Q8. The positive input of the operational amplifier OP1 receives through a resistance R29, a capacitor Q8 and a resistance R27, a flyback pulse with a horizontal scanning period, for example, (i.e., a pulse generated at a horizontal scanning period for defining a boosting operation in the flyback transformer) applied via the terminal T5. A resistance R28 is connected between one electrode of the capacitor C8 and the ground potential. A feedback resistance R24 is connected between the positive input and the output of the operational amplifier OP1. A reference voltage determined by the resistance ratio of a resistance R25 to a resistance R26 is applied to the negative input of the operational amplifier OP1. The output of the operational amplifier OP1 is coupled to the base of the transistor Q7 via a coupling capacitor C7. A DC bias voltage determined by the resistance ratio of a resistance R70 to a resistance R71 is applied to the base of the transistor Q7. The transistor Q7 has its collector connected to the supply voltage Vcc via the resonance circuit LC formed of a coil and a capacitor C6 and via a resistance R22, and its emitter connected to the ground potential via a resistance R23. Further, the collector of the transistor Q7 is connected to the base of the transistor Q8. The transistor Q8 has its emitter connected to the supply voltage Vcc via a resistance R21 and also to one electrode of the capacitor C4, and its collector connected to the ground potential. The capacitor C4 outputs a horizontal modulation output voltage. A horizontal flyback pulse FBP supplied to the terminal T5 is divided in voltage by a voltage dividing resistance of the resistances R28 and R29, and then applied to the positive input of the operational amplifier OP1 via the coupling capacitor C8 and the input resistance R27. The operational amplifier OP1 compares a positive input voltage with a reference voltage applied from the reference resistances R25 and R26 and amplifies a result of this comparison to output and transmit the comparison result signal to the base of the transistor Q7 via the capacitor C7. The transistor Q7 and the resonance circuit LC constitute a tuning amplifier for making the horizontal scanning frequency $f_H$ be the resonant frequency, and converts a signal from the operational amplifier OP1 to a parabola wave voltage. The transistor Q8 slices an output of this tuning amplifier (the transistor Q7) at the level defined by the emitter resistance R21 to output the same. A modulated output voltage is output via the capacitor C4. The sum of the output through the capacitors C3 and C4 and a DC bias voltage provides the first reference voltage Vf1 which changes in the horizontal and vertical scanning periods. Next, the operation of each of the circuits will be described with reference to the operation waveform diagrams thereof.

Figure 7:
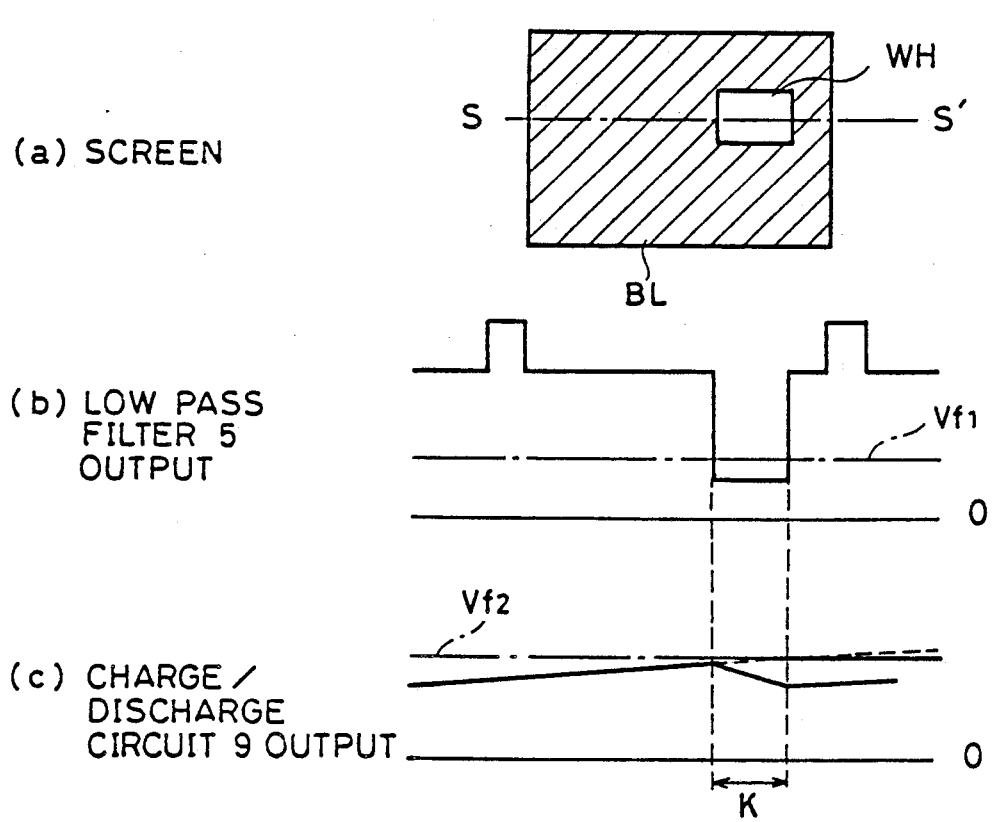
FIG. 7 is a signal waveform diagram illustrating the operation of charge/discharge circuitry shown in FIG. 6.

First of all, a description will be given on the operations of the low pass filter 5, the first comparator 6 and the charge/discharge circuit 9 with reference to FIG. 7. Such a case is considered that the portion having the high luminance portion WH on the screen is scanned by the scanning line S—S', as shown in FIG. 7. A luminance signal $-Y$ of negative polarity is transmitted from the luminance control circuit 3 via a terminal T3 to the low pass filter 5. The emitter follower transistor Q1 is turned on responsive to this luminance signal $-Y$ of negative polarity so as to derive a signal corresponding to this luminance signal of negative polarity. An output signal from the transistor Q1 has its high frequency components removed by the resistance R10 and the capacitor C2 and thus only low frequency components thereof are extracted. The output of the low pass filter 5 has its portion corresponding to the high luminance portion WH on the screen only go to a lower level than the reference voltage Vf1. Now, it is assumed that the reference voltage Vf1 is a constant voltage for the convenience of the description. The output voltage of the low pass filter 5 is compared with the reference voltage Vf1 at a differential comparator stage formed of the transistors Q2, Q3 and Q4. Therefore, the transistor Q3 is turned on in the portion corresponding to the high luminance portion WH, while the transistor Q2 is turned on in the other portions. As a result, a signal of the "L" level is output from the first comparator circuit 6 to be transmitted to the charge/discharge circuit 9, during a period corresponding to the high luminance portion in which the transistor Q3 is turned on. A collector voltage of the transistor Q3 is transmitted to the base of the pnp transistor Q9. Therefore, the transistor Q9 is turned on only in the portion corresponding to the high luminance portion WH so as to discharge rapidly a voltage of the capacitor C9 via the low resistance R31. On the other hand, the transistor Q9 is OFF in the portion corresponding to the other portion BL, so that the capacitor C9 is relatively slowly charged via the resistance R32. A time constant in discharging of the charge/discharge circuit 9 is, for example, about a hundred times a time constant in charging thereof. The potential level of the capacitor C9 is lowered by the discharge of the capacitor C9 in the portion corresponding to this high luminance portion. If the high luminance portion WH is not less than a predetermined width, the charge/discharge in the charge/discharge circuit 9 are repeated, thereby gradually lowering the voltage of the capacitor C9. FIG. 7(c) shows the state of the charge/discharge circuit 9, i.e., the state of an emitter output of the transistor Q10 after the high luminance portion WH is scanned several times.

In the case that the high luminance portion WH has a predetermined area or less, the output level of the charge/discharge circuit 9 is at the second reference voltage Vf2 or more. In the case that the high luminance portion WH is not smaller than a predetermined area, the emitter output of the transistor Q10 is not larger than the second reference voltage Vf2. The comparator circuit 10 compares the emitter output of the transistor Q10 with the second reference voltage Vf2 defined by the resistances R34 and R35. Thus, the comparator circuit 10 outputs a signal of "L" level in the case that the emitter output of the bipolar transistor Q10 is lower than the reference voltage Vf2; however, it outputs a signal of the "H" level in the case that the output of the transistor Q10 exceeds the reference voltage Vf2. That is, in the second comparator circuit 10, the output of this operational amplifier OP2 goes to the "L" level only when the high luminance portion WH not smaller than a predetermined area exists locally on the screen (see FIG. 8). The output of the operational amplifier OP2 is supplied to the base of the input transistor Q11 in the control signal generating circuit 11. The transistor Q11 is turned on only when the output of the operational amplifier OP2 is at the "H" level so as to charge rapidly the capacitor C10 via the resistance R38.

If the high luminance portion WH not less than a predetermined area exists, the output signal level of the operational amplifier OP2 falls to the "L" level, so that the transistor Q11 is turned off. Therefore, the capacitor C10 is gradually discharged via the high resistance R37 and the resistance R36 and thus its potential level gradually is lowered. A voltage level of the capacitor C10 is transmitted to the terminal T1 via the emitter follower transistor Q12 and the resistance R40. The gradually lowered control signal level from the control signal generating circuit 11 causes a voltage applied to the control terminal T1 to gradually lower and therefore the contrast/luminance of the screen to be gradually reduced, regardless of a contrast control level constituted by the resistances R3, R5 and R7 and the variable resistance VR1.

When the high luminance portion WH disappears, an output from the charge/discharge circuit 9, i.e., the emitter output voltage of the transistor Q10 exceeds the reference voltage Vf2. Therefore, the output of the operational amplifier OP2 goes to the "H" level, thereby turning on the transistor Q11. As a result, the capacitor C10 is charged at a high speed via the resistance R38 and the diode D4. A charge voltage when the capacitor C10 is at the normal state (i.e., when the high luminance portion does not exist) is transmitted to the terminal T1 via the transistor Q12 and the resistance R40, so that the contrast/luminance is recovered rapidly to the original state. The ratio of a time constant in discharging of the capacitor C10 via the resistances R37 and R36 to a time constant in charging thereof via the resistance R38 is, for example, set to approximately 400:1.

The following description explains why a signal voltage level applied to the terminal T1 gradually falls depending on the gradual lowering of the voltage level of a control signal from the control signal generating circuit 11. By adjusting the variable resistance VR1 at a suitable position, a control voltage for providing a predetermined contrast ratio is applied to the terminal T1 via the resistance R3. A saturation charge voltage of the capacitor C10 is, at the normal state, also transmitted to the terminal T1 via the emitter follower transistor Q12 and the resistance R40. At this time, if a control signal voltage level from the circuit 11 at the normal state is higher than the contrast control signal voltage level from the resistance R3, the control signal voltage level from the resistance R3, the control signal voltage level from the circuit 11 is discharged via the resistance R3, the variable resistance VR1 and the resistance R7 so as to be held at the contrast control signal voltage level determined by the variable resistance VR1. However, if the control signal voltage level from the circuit 11 gradually falls down to under the contrast ratio control signal voltage level determined by the variable resistance VR1, a voltage level on the terminal T1 is discharged via the resistance R40 and the resistance R39, so that a signal voltage level transmitted to the control terminal T1 falls. Accordingly, when the high luminance portion WH not less than a predetermined area exists despite the determined contrast ratio, the contrast ratio can be reduced responsive to a control signal from the control signal generating circuit 11.

Figure 8:
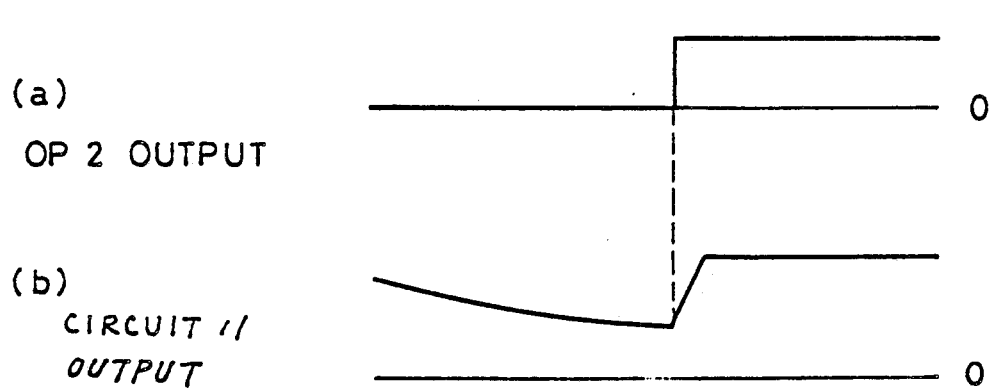
FIG. 8 is a signal waveform diagram illustrating the operation of a second comparator circuit and of a control signal generating circuit shown in FIG. 6.

In the operation waveform diagram shown in FIG. 8, the discharge and charge are performed when the second comparator output is at the "L" level and at the "H" level, respectively, and thus it is different from the operation waveform diagram shown in FIG. 5 in signal polarity. However, this difference may be overcome, for example, merely by inverting an output polarity of the operational amplifier OP2, and further the polarity of the signal shown in FIG. 5 is obtained merely by replacing the positive input with the negative input thereof or vice versa, or the transistor Q11 with a pnp transistor. That is, the configuration shown in FIG. 6 is simply one of the examples of the detailed configuration, so that these signals can be made opposite in polarity to the shown ones by changing the conductivity type of the transistors. Similarly, a configuration can easily be obtained that the level of the control signal voltage from the circuit 11 is lowered when the high luminance portion not less than a predetermined area exists.

Next, a description will be given on the operation of the circuit for generating the first reference voltage Vf1, which has been described as a constant voltage in the foregoing, i.e., the operation of the horizontal modulation voltage producing circuit 8 and of the vertical modulation voltage producing circuit 7. First of all, the operation of the horizontal modulation voltage producing circuit 8 will be described with reference to FIG. 9. A horizontal flyback pulse FBP shown in FIG. 9(a) is supplied to the terminal T5. The horizontal flyback pulse FBP is divided in voltage by the resistances R29 and R28, and then transmitted to the operational amplifier OP1 via the coupling capacitor C8 and the resistance R27. The operational amplifier OP1 compares the pulse signal supplied to the positive input thereof with a reference voltage defined by the resistances R25 and R26, and amplifies a result of this comparison so as to transmit to the base of the transistor Q7 via the coupling capacitor C7. A DC bias voltage provided by the resistances R70 and R71 is applied to the base of the transistor Q7. The resistance R22, the coil L, the capacitor C6 and the transistor Q7 constitute together a tuning amplifier for making a horizontal period be the center frequency thereof. Therefore, the pulse signal from the operational amplifier OP1 is converted by this tuning amplifier into a sinewave having a horizontal scanning period as shown in FIG. 9(b), and is applied to the base of the transistor Q8. The transistor Q8 is turned on when a forward bias is applied across the base and the emitter. Accordingly, by employing a potential difference between the base and the emitter of the transistor Q8, a sinewave voltage (FIG. 9(b)) has its near upper peak portions be sliced by the turning-off of the transistor Q8. The sliced voltage signal (see FIG. 9(c)) is output via the capacitor C4 as a modulated output voltage. A slice level of this sinewave voltage is determined by the resistance R21. This slicing adjusts a detection/decision level of the high luminance portion.

The operation of the vertical modulation voltage producing circuit 7 will now be described. A saw-tooth wave signal with the vertical scanning period (e.g., referred to (FIG. 11(b)) is applied to the base of the transistor Q5 via the terminal T4. The transistor Q5 passes therethrough the saw-tooth wave signal in the emitter follower manner to the integrating circuit formed of the resistance R19 and the capacitor C5. The integrating circuit (i.e., the resistance R19 and the capacitor C5) integrates a saw-tooth wave voltage from the transistor Q5 to convert into a parabola wave voltage (referred to (FIG. 11(c)) and then transmits the same to the base of the transistor Q6. The transistor Q6 outputs this parabola wave voltage in the emitter follower manner via the capacitor C3. The respective modulation wave voltages of the capacitors C3 and C4 are added to the DC bias voltage and output as the first reference voltage Vf1.

As has been described, the doming phenomenon is liable to occur at the periphery of the screen (precisely, a portion slightly inward from the periphery) rather than at the center of the screen. Accordingly, by employing, as the reference voltage Vf1, the one that the respective output voltages of the horizontal and vertical modulation voltage producing circuits 7 and 8 are superimposed on a constant DC bias voltage, it becomes possible to enhance the sensitivity in detection of the high luminance portion at the respective peripheries in the horizontal and vertical directions rather than at the center of the screen, resulting in the accurate operation of preventing the doming phenomenon.

Excessive electron beam current flows in the presence of the high luminance portion such that the screen is largely colored in white. This excessive electron beam current flow causes an increased current to flow through the resistance $R_F$ in FIG. 2, and a lowered voltage on the high voltage winding of the flyback transformer FB causes a discharge in the capacitor C1. This forced discharge in the capacitor C1 causes the diodes D1 and D2 to turn on and further rapid falling of the control signal level applied to the luminance control circuit 3 and the contrast control circuit 2, and thus causing a rapid and significant reduction in contrast and luminance.

Therefore, in operation of the ABL/ACL, the level of the luminance signal of negative polarity output from the luminance control circuit 3 via the terminal T3 is always larger than the first reference voltage Vf1 of the first comparator circuit 6. Thus, no detection of the high luminance portion is carried out in the high luminance portion detecting circuit 4 at this state. That is, the high luminance portion detecting circuit 4 only detects a partial high luminance portion not less than a predetermined area where the doming phenomenon is caused, interdependent with the operation of the above described ABL/SCL and of the low pass filter 6, so that the contrast/luminance are gradually reduced corresponding to the detected high luminance portion.

A configuration shown in FIG. 10 may be employed in place of the horizontal modulation voltage producing circuit 8 in FIG. 6. The configuration shown in FIG. 10 includes an operational amplifier OP3. A capacitor C12 and a resistance R42 are connected in parallel between the negative input and the output portion of the operational amplifier OP3. Accordingly, the capacitor C12, the resistance R42 and the operational amplifier OP3 constitute a Miller integrator-type integrating circuit. The positive input of the operational amplifier OP3 is connected to a reference voltage Vr. The negative input of the operational amplifier OP3 is supplied with an input signal via a terminal T5, an integrating circuit formed of a resistance R40 and a capacitor C11, and a resistance R41. An output of the operational amplifier OP3 is transmitted via a resistance R43 and a coupling capacitor C13. An output signal from the coupling capacitor C13 provides a horizontal modulation voltage. Next, an operation in FIG. 10 will be described with reference to FIG. 11 being the operation waveform diagram thereof.

A flyback pulse with the horizontal scanning period (see FIG. 11(a)) is applied to the terminal T5. The integrating circuit formed of the resistance R40 and the capacitor C11 integrates this pulse signal, derives a saw-tooth wave voltage (see FIG. 11(b)) and supplies the same to the negative input of the operational amplifier OP3. The operational amplifier OP3 integrates the saw-tooth wave voltage by employing the capacitor C12 and the resistance R42 to derive a parabola waveform voltage (see FIG. 11(c)). Accordingly, a parabola wave voltage having a desired horizontal scanning period can be obtained.

The circuit configuration shown in FIG. 10 can be employed as the circuit 7 for producing a vertical modulation voltage by excepting the resistance R40 and the capacitor C11 therefrom and being coupled to the terminal T4.

Furthermore, with employment of the circuit configuration of FIG. 10, a voltage signal applied to the terminal T4 need not be a saw-tooth wave voltage signal with the vertical scanning period, and thus a pulse signal with the vertical scanning period can simply be used.

Figure 12:
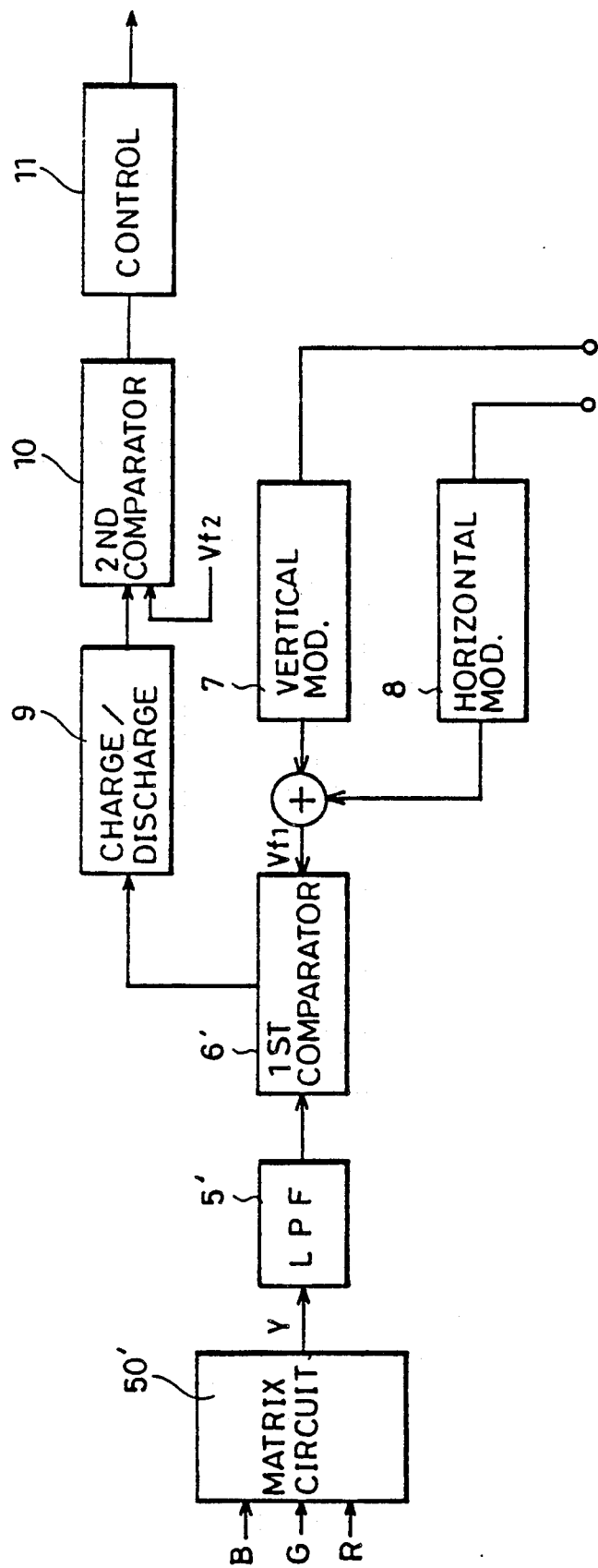
FIG. 12 is a diagram illustrating the configuration of a high luminance portion detecting block in the circuitry for preventing the doming phenomenon according to still another embodiment of the present invention.
Figure 13:
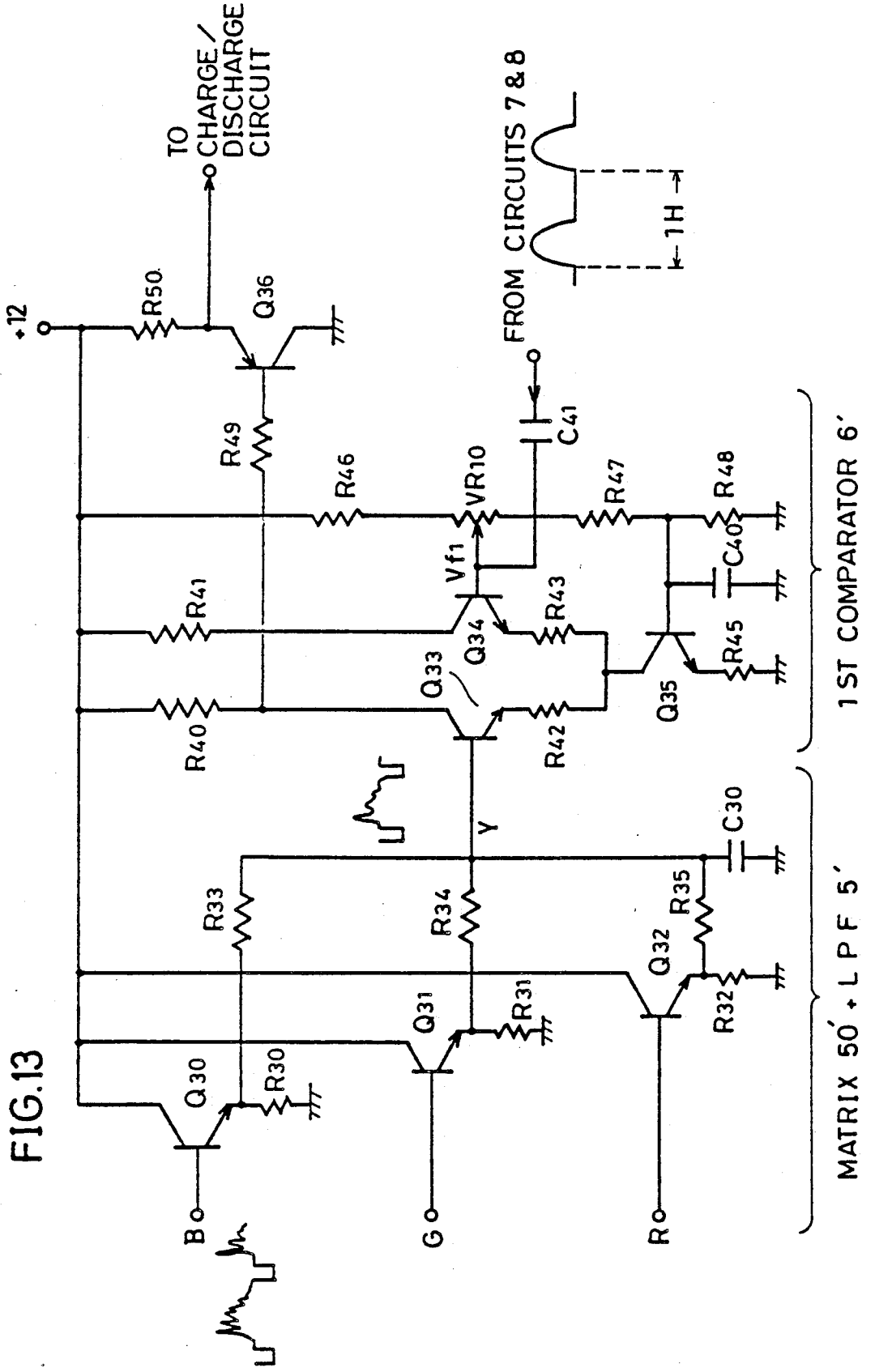
FIG. 13 is a diagram illustrating one example of the detailed configurations of input stage and a first comparator of the high luminance detecting circuit shown in FIG. 12.

The above described embodiment provides the configuration that the high luminance portion is detected by employing the luminance signal of negative polarity. However, it is also possible in place of the above configuration to detect the high luminance portion by employing a luminance signal of positive polarity. That is, as shown in FIG. 12, such a configuration can also implement the same effect as the above described embodiment, that includes a matrix circuit 50' matrixing R, B and G signals to output a luminance signal Y, a low pass filter 5' for only passing therethrough low frequency components of the luminance signal Y from the matrix circuit 50', and a first comparator circuit 6' for comparing an output of the low pass filter 5' with a reference voltage Vf1. In this case, the same configuration as those shown in FIG. 2 may be employed for the vertical modulation circuit 7, the horizontal modulation circuit 8, the charge/discharge circuit 9, the second comparator circuit 10 and the control signal generating circuit 11, respectively. FIG. 13 shows one example of the detailed configuration of the matrix circuit 50', the low pass filter 5' and the first comparator circuit 6' shown in FIG. 12.

Referring to FIG. 13, the matrix circuit 50' and the low pass filter 5' include in common npn bipolar transistors Q30, Q31 and Q32. The transistor Q30 has its collector connected to a supply potential +12 V, its base supplied with the B signal, and its emitter connected to the ground potential via a resistance R30. The transistor Q31 has its collector connected to the supply potential +12 V, its base supplied with the G signal, and its emitter connected to the !ground potential via a resistance R31. The transistor Q32 has its collector connected to the supply potential +12 V, its base supplied with the R signal, and its emitter connected via a resistance R32 to the ground. A low pass filter circuit portion includes resistances R33, R34 and R35 and a capacitor C30. By setting respective resistance values of the resistances R33, R34 and R35 to a suitable ratio, the B, G and R signals are added at the capacitor C30 to supply a luminance signal Y of positive polarity. Moreover, the resistances R33, R34 and R35 and the capacitor C30 constitute a low pass filter so as to remove high frequency components of the supplied Y signal and only supply the luminance signal of low frequency components.

The first comparator 6' includes npn bipolar transistors Q33, Q34 and Q35 constituting a differential comparator stage. The bipolar transistor Q33 has its collector connected to the supply potential of +12 V via a resistance R40, and its emitter connected to the collector of the transistor Q35 via a resistance R42. The transistor Q34 has its collector connected to the supply potential of +12 V via a resistance R41, its emitter connected to the collector of the transistor Q35 via a resistance R43, and its base supplied with output voltages of the modulation voltage circuits 7 and 8 via a capacitor C41 and also with a DC bias voltage from a resistance R46, a variable resistance VR10, resistances R47 and R48. The transistor Q35 has its collector coupled to the respective emitters of the transistors Q33 and Q34 via resistances R42 and R43, its emitter connected to the ground potential via a resistance R45, and its base supplied with the DC bias voltage defined by the resistance R46, the variable resistance VR10, the resistances R47 and R48. The transistor Q35 has its base connected to a capacitor C40 for holding a base voltage provided in parallel to the resistance R48.

A pnp bipolar transistor Q36 constituting an output stage has its base connected to the collector of the transistor Q33 via resistance R49, its emitter connected to the supply potential of +12 V via a resistance R50, and its collector connected to the ground potential. A signal indicating a result of the comparison is derived from the emitter of the transistor Q36 and applied to the charge/discharge circuit 9. The operation will now be described briefly.

The B, G and R signals are transmitted to the capacitor C30 in the emitter follower manner via the respective transistors Q30, Q31 and Q32, so that the luminance signal Y of positive polarity is supplied. The transistor Q33 has its base supplied with the low frequency components of the luminance signal Y of positive polarity, while the transistor Q34 has its base supplied with a modulation voltage via the capacitor C41 and with a DC bias voltage defined by the resistances R40, VR10, R47 and R48. Therefore, when the low frequency components of the luminance signal Y of positive polarity becomes higher than the reference voltage Vf1 applied to the base of the transistor Q34, the transistor Q33 is turned on and the collector potential thereof falls to the "L" level. On the other hand, when the level of the luminance signal Y is lower than the first reference voltage Vf1, the transistor Q33 is turned off and the collector voltage level thereof rises to the "H" level. The pnp transistor Q36 is turned on when the base voltage thereof becomes higher than a forward saturation voltage between the base and the emitter, but is turned off when the base voltage becomes lower. Therefore, the bipolar transistor Q36 is turned on to output a signal of the "L" level when the transistor Q33 is ON, while the transistor Q36 is turned off to output a signal of the "H" level when the transistor Q33 is OFF. Thus, when the luminance signal Y rises higher than the reference potential Vf1, i.e., at the presence of the high luminance portion, the transistors Q33 and Q36 are turned on to supply the signal of "L" level, so that a discharge in the charge/discharge circuit 9 is carried out. However, when the luminance signal Y falls lower than the reference potential Vf1, an emitter voltage of the transistor Q36 rises to the "H" level, so that a charge operation is carried out in the charge/discharge circuit 9. Therefore, due to this circuit configuration, the high luminance portion can be detected similarly to the circuit in FIG. 6 by employing the luminance signal Y of positive polarity, thereby implementing the circuitry for preventing the doming phenomenon.

In the above described embodiment, the modulation voltage is employed as the reference voltage Vf1, the level of which changes in the horizontal and vertical periods, in order to enhance the sensitivity in detection of the high luminance portion at the periphery of the screen. In place of this modulation voltage with the horizontal and vertical periods, however, the same effect as in the above described embodiment can be achieved by employing only the horizontal modulation voltage superimposed on the DC bias voltage as the reference voltage Vf1. This is because the doming phenomenon is normally liable to occur at the both sides of the screen.

Furthermore, in the above described embodiment, the control signal from the control signal generating circuit 11 is only applied to the contrast control circuit 2. However, the control signal from the control signal generating circuit 11 may be applied to the luminance control circuit 3, and further the same effect can be achieved as in the above embodiment even in the configuration that the control signal is applied to both the luminance and contrast control circuits 2 and 3.

As has been described heretofore, according to the present invention, since such a configuration is provided as to detect the high luminance portion being not less than a predetermined area on the reproduced screen and thus to gradually reduce the contrast/luminance of the screen depending on the detection signal, the doming phenomenon can be reliably prevented without providing luminance changes objectionable to the viewers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Circuitry for preventing a doming phenomenon in a television receiver for producing a video signal, said television receiver having a screen on which a picture is reproduced, said circuitry comprising:
    a decision means, responsive to a luminance signal included in said video signal, for deciding whether or not a high luminance portion not less than a predetermined area exists on said screen, said decision means includes
        first comparison means for comparing said luminance signal with a first reference voltage,
        area detection means responsive to an output of said comparison mean for detecting the area of the high luminance portion on said screen, and
        area decision means for comparing an output of said area detecting means with a second reference voltage and for deciding whether or not said detected area is not less than a predetermined area; and
    luminance/contrast reduction means, responsive to a signal for detecting the presence of the high luminance portion not less than said predetermined area from said decision means, for gradually reducing at least one of the luminance and contrast of said screen.

2. Circuitry for preventing a doming phenomenon in accordance with claim 1, wherein
    said area detection means comprises
    first shifting means for shifting a voltage of the output of said first comparison means in a first direction at a first rate when the output of said first comparison means indicates the presence of said high luminance portion, and for shifting the output voltage of said first comparison means in a second direction at a second rate which is slower than said first rate when said first comparison means output indicates the absence of said high luminance portion.

3. Circuitry for preventing a doming phenomenon in accordance with claim 1, wherein
    said area decision means comprises
    second comparison means for comparing said area detection means output with the second reference voltage.

4. Circuitry for preventing a doming phenomenon in accordance with claim 1, further comprising first reference voltage generating means for generating said first reference voltage,
    said first reference voltage generating means being responsive to a signal which changes at a horizontal scanning period of said screen for generating, as said first reference voltage, a signal the output level of which changes at said horizontal scanning period, thereby decreasing a reference level of said comparison means at the periphery of said screen and improving the sensitivity in detection of the high luminance portion at said periphery.

5. Circuitry for preventing a doming phenomenon in accordance with claim 1, further comprising reference voltage generating means for generating said first reference voltage, wherein
said reference voltage generating means comprises
first means responsive to a signal applied at a horizontal scanning period of said screen for generating a voltage signal the level of which changes at said horizontal scanning period,
second means responsive to a signal which changes in a vertical scanning period of said screen for generating a voltage signal the output voltage level of which changes at said vertical scanning period, and
third means for adding the voltage signals from said first and second means and for generating said first reference voltage.

6. Circuitry for preventing a doming phenomenon in a television receiver for reproducing a video signal, said television receiver comprising a screen on which said video signal is reproduced, a circuit for controlling luminance of said screen, and a circuitry for controlling contrast of said screen, said circuitry comprising:
control means, responsive to a luminance signal included in said video signal, for deciding whether or not a high luminance portion not less than a predetermined area exists on said screen, said control means includes
comparison means for comparing said luminance signal with a first reference voltage,
area detecting means responsive to the output of said comparison means for detecting the area of the high luminance portion on said screen, and
decision means for comparing the output of said area detection means with a second reference voltage and for deciding whether or not said detected area is not less than a predetermined area; and
control signal generating means, responsive to a signal for detecting the presence of the high luminance portion not less than said predetermined area from said decision means, for generating a control signal for gradually reducing at least one of the luminance and contrast of said screen and for applying said control signal to at least one of said luminance control circuit and said contrast control circuit.

7. Circuitry for preventing a doming phenomenon in accordance with claim 6, wherein
said area detection means comprises
first shifting means for shifting a voltage of said comparison means output in a first direction at a first rate when said comparison means output indicates the presence of said high luminance portion, and for shifting the output voltage thereof in a second direction at a second rate which is slower than said first rate when said comparison means output indicates the absence of said high luminance portion.

8. Circuitry for preventing a doming phenomenon in accordance with claim 6, wherein
said decision means comprises
means for comparing said area detection means output with a second reference voltage.

9. Circuitry for preventing a doming phenomenon in accordance with claim 6, wherein a first reference voltage applied to said comparison means has its level decreased in an absolute value at the periphery of said screen, thereby enhancing the sensitivity in detection of the high luminance portion at the periphery of said screen.

10. A method of preventing a doming phenomenon in a television receiver for reproducing a video signal, said television receiver having a screen on which said video signal is reproduced, said method comprising the steps of:
deciding whether or not a high luminance portion not less than a predetermined area exists on said screen in response to a luminance signal included in said video signal, said decision step further comprises the steps of
comparing said high luminance signal with a first reference voltage, thereby detecting the presence or absence of the high luminance portion on said screen,
generating a first control signal the signal level of which shifting at a first rate in a first direction in response to the detection of the luminance portion and shifting at a second rate which is slower than said first rate in response to the detection of the absence of said luminance portion, and
comparing said first control signal with a second reference voltage and deciding whether or not the high luminance portion on said screen is not less in area than a predetermined area; and
reducing gradually at least one of contrast and luminance of said screen in response to detection of the high luminance portion not less than said predetermined area in said decision step.

11. A method of preventing a doming phenomenon n accordance with claim 6, wherein
said reduction step comprises the step of
reducing gradually at least one of the luminance and contrast of said screen in response to the detection of the presence of the high luminance portion not less than said predetermined area, and
generating a second control signal for rapidly recovering said at least one of the reduced contrast and luminance of said screen to an original state in response to the detection of the absence of the high luminance portion not less than said predetermined area.

12. A doming-free television receiver having a screen on which a video signal is reproduced, comprising:
detection means, responsive to a luminance signal included in said video signal, for detecting the presence of a high luminance portion on said screen;
area detection means, responsive to an output of said detection means, for detecting the area of said detected high luminance portion;
decision means, responsive to an output of said area detection means, for deciding whether or not the area of the detected high luminance portion is not less than a predetermined value; and
luminance/contrast reduction means, responsive to said decision means indicating that said high luminance portion is not less than a predetermined area, for gradually reducing at least one of the luminance and contrast of said screen, and said luminance/contrast reduction means responsive to nondetection of said high luminance portion for rapidly releasing said gradual reduction of said at least one of the luminance and contrast.

13. Circuitry for preventing a doming phenomenon in a television receiver for producing a video signal, said television receiver having a screen on which a picture is reproduced, said circuitry comprising:
- a decision means, responsive to a luminance signal included in said video signal, for deciding whether or not a high luminance portion not less than a predetermined area exists on said screen; and
- luminance/contrast reduction means responsive to a signal for detecting the presence of the high luminance portion not less than said predetermined area from said decision means for gradually reducing at least one of the luminance and contrast of said screen, said luminance/contrast reduction means including
- second shifting means for shifting a voltage of the output of said decision means in a first direction at a first rate when said decision means output indicates the presence of the high luminance portion not less than said predetermined area, and for shifting the output voltage of said decision means in a second direction at a second rate which is faster than said first rate in response to said decision means output indicating the absence of the high luminance portion not less than said predetermined area, and
- contrast/luminance changing means responsive to an output of said voltage changing means for changing at least one of the contrast and luminance of said screen, said contrast/luminance changing means gradually reducing at least one of said contrast/luminance in response to the change of said voltage shifting means output in said first direction.

14. Circuitry for preventing a doming phenomenon in a television receiver for producing a video signal, said television receiver having a screen on which a picture is reproduced, said circuitry comprising:
- a decision means, responsive to a luminance signal included in said video signal, for deciding whether or not a high luminance portion not less than a predetermined area exists on said screen, said decision means is to have sensitivity in detection of the high luminance portion enhanced at the periphery of said screen rather than at the center thereof; and
- luminance/contrast reduction means, responsive to a signal for detecting the presence of the high luminance portion not less than said predetermined area from said decision means, for gradually reducing at least one of the luminance and contrast of said screen.

15. Circuitry for preventing a doming phenomenon in a television receiver for producing a video signal, said television receiver having a screen on which a picture is reproduced, said circuitry comprising:
- a decision means, responsive to a luminance signal included in said video signal, for deciding whether or not a high luminance portion not less than a predetermined area exists on said screen, said decision means has an input stage comprising low pass means for receiving said luminance signal and for passing only predetermined low frequency components thereof; and
- luminance/contrast reduction means, responsive to a signal for detecting the presence of the high luminance portion not less than said predetermined area from said decision means, for gradually reducing at least one of the luminance and contrast of said screen.

16. Circuitry for preventing a doming phenomenon in a television receiver for reproducing a video signal, said television receiver including a screen on which said video signal is reproduced, a circuit for controlling luminance of said screen, and a circuitry for controlling contrast of said screen, said circuitry comprising:
- control means, responsive to a luminance signal included in said video signal, for deciding whether or not a high luminance portion not less than a predetermined area exists on said screen; and
- control signal generating means responsive to a signal for detecting the presence of the high luminance portion not less than said predetermined area from said decision means for generating a control signal for gradually reducing at least one of the luminance and contrast of said screen and for applying said control signal to at least one of said luminance control circuit and said contrast control circuit said control signal generating means including shifting means for shifting an output voltage of said decision means in a first direction at a first rate when said decision means output indicates that said high luminance portion is not less than a predetermined area, and for shifting the output voltage thereof in a second direction at a second rate which is faster than said first rate responsive to said decision means output indicating the absence of the high luminance portion not less than said predetermined area.

17. A method of preventing a doming phenomenon in a television receiver for reproducing a video signal, said television receiver having a screen on which said video signal is reproduced, said method comprising the steps of:
- deciding whether or not a high luminance portion not less than a predetermined area exists on said screen in response to a luminance signal included in said video signal; and
- reducing gradually at least one of contrast and luminance of said screen in response to detection of the high luminance portion not less than said predetermined area in said decision step, said reduction step further comprises the steps of
- reducing gradually at least one of the luminance and contrast of said screen in response to the detection of the presence of the high luminance portion not less than said predetermined area, and
- generating a second control signal for recovering said at least one of the reduced contrast and luminance of said screen to an original state in response to the detection of the absence of the high luminance portion not less than said predetermined area.

* * * * *